(12) United States Patent
Shekarriz (10) Patent No.: US 9,695,093 B2
(45) Date of Patent: Jul. 4, 2017

(54) HYDROTHERMAL CONVERSION PROCESS

(71) Applicant: Alireza Shekarriz, Rio Rancho, NM (US)

(72) Inventor: Alireza Shekarriz, Rio Rancho, NM (US)

( * ) Notice: Subject to any disclaimer, the term of this patent is extended or adjusted under 35 U.S.C. 154(b) by 13 days.

(21) Appl. No.: 14/733,798

(22) Filed: Jun. 8, 2015

(65) Prior Publication Data

US 2015/0361372 A1  Dec. 17, 2015

Related U.S. Application Data

(60) Provisional application No. 62/010,564, filed on Jun. 11, 2014.

(51) Int. Cl.
| | |
|---|---|
| *C05F 1/00* | (2006.01) |
| *C05F 17/00* | (2006.01) |
| *C10L 5/44* | (2006.01) |
| *C10L 1/00* | (2006.01) |
| *C05F 11/00* | (2006.01) |
| *C05F 7/00* | (2006.01) |
| *C10L 9/08* | (2006.01) |

(52) U.S. Cl.
CPC ............... *C05F 17/00* (2013.01); *C05F 7/00* (2013.01); *C05F 11/00* (2013.01); *C10L 1/00* (2013.01); *C10L 5/445* (2013.01); *C10L 5/447* (2013.01); *C10L 9/086* (2013.01); *C10L 2290/06* (2013.01); *C10L 2290/148* (2013.01); *C10L 2290/26* (2013.01); *C10L 2290/58* (2013.01); *Y02E 50/10* (2013.01); *Y02E 50/30* (2013.01); *Y02E 50/343* (2013.01); *Y02P 20/129* (2015.11); *Y02P 20/145* (2015.11); *Y02W 30/43* (2015.05); *Y02W 30/47* (2015.05)

(58) Field of Classification Search
None
See application file for complete search history.

(56) References Cited

U.S. PATENT DOCUMENTS

| | | |
|---|---|---|
| 5,370,999 A | 12/1994 | Stuart |
| 6,635,178 B2 | 10/2003 | Bowman |
| 7,727,355 B2 | 6/2010 | Goto |
| 8,481,642 B2 | 7/2013 | Antonietti |
| 8,513,004 B2 | 8/2013 | Heathcote |

(Continued)

FOREIGN PATENT DOCUMENTS

WO    2012/095408 A    7/2012

OTHER PUBLICATIONS

Kruse, Current Opinion in Chemical Biology 2013, 17:515-521.
Ocfemia, Transactions of the ASABE, vol. 49(2):533-541 (2006).

*Primary Examiner* — Chester Barry
(74) *Attorney, Agent, or Firm* — Gary C. Cohn PLLC (57) ABSTRACT

A hydrothermal conversion process includes a mixing step wherein an aqueous slurry of a solid feedstock material with a steam stream to produce a reaction mixture having a temperature of at least 160° C. and which is at a pressure sufficient to keep water as a subcooled liquid. The process is fast and effective, requires only simple equipment and is highly energy-efficient. The process is also readily scalable, can be operated continuously or semi-continuously and can be tailored to produce carbonized solids or liquefaction products, all of which typically have increased economic value compared with the starting materials.

20 Claims, 3 Drawing Sheets

(56) References Cited

U.S. PATENT DOCUMENTS

| | | | |
|---|---|---|---|
| 8,603,789 B2 | 12/2013 | Harlick | |
| 2004/0164019 A1* | 8/2004 | Fassbender | C02F 1/02 |
| | | | 210/603 |
| 2005/0067122 A1 | 3/2005 | Kazem | |
| 2008/0006518 A1 | 1/2008 | Shimojo | |
| 2008/0299276 A1* | 12/2008 | Eubanks | A23L 23/00 |
| | | | 426/535 |
| 2009/0178671 A1* | 7/2009 | Ahring | C12P 7/08 |
| | | | 127/37 |
| 2011/0056125 A1 | 3/2011 | Antonietti | |
| 2012/0000120 A1 | 1/2012 | Stark | |
| 2012/0280180 A1* | 11/2012 | Elliott | B09B 3/00 |
| | | | 252/372 |
| 2014/0045227 A1* | 2/2014 | Rarbach | C12N 9/2434 |
| | | | 435/99 |

* cited by examiner

HYDROTHERMAL CONVERSION PROCESS

This invention relates to a hydrothermal conversion process for converting organic matter to one or more hydrothermal conversion products.

Hydrothermal conversion is a method by which an organic feedstock is converted to other useful carbonaceous compounds. The organic feedstock generally (but not always) is a biological material of one kind or another, and for that reason typically is a complex mixture of compounds. A typical organic feedstock is or includes one or more biological waste products, such as plant waste products, animal (including human) waste products, agricultural and slaughterhouse wastes, food wastes and other industrial and materials processing wastes that have little if any economical value in their existing form. Hydrothermal conversion allows these feedstocks to be converted to higher-value conversion products. The conversion products can range from oily liquids and carbonized solids that have value as fuels and fertilizers, to low molecular weight liquid organic compounds that, depending on their precise nature, find value as chemical feedstocks and in other potential applications.

Hydrothermal conversion involves the reaction of the feedstock with water at elevated temperature and pressure. At moderately elevated temperatures and/or pressures, the carbonized solid is a major product. As temperature and pressure increase, carbonization decreases and is replaced by liquefaction, i.e. the formation of oils and low molecular weight liquid organic compounds.

The hydrothermal conversion process has roots that extend to at least the early part of the last century. The basic underlying chemistry is well-known, at least with respect to feedstocks that contain mainly saccharides and polysaccharides. Despite this, the process has received very little acceptance as a way to recover higher-value products from biological wastes. One reason for this is that existing hydrothermal conversion processes become prohibitively expensive when scaled past laboratory or pilot scale, partly due to the need for pressurized equipment. Capital and operating costs quickly escalate with increasing nameplate capacity, so that even small commercial-scale installations become expensive. A second reason is that the process is difficult to control at larger scale. A result of this is a great variability in the products that are obtained. Much of the feedstock is incompletely converted, or is not converted to the desired product. Even carbonized solids produced in this process tend to be highly variable in carbon content and thus have unpredictable fuel value. A third problem is that many potential applications for the hydrothermal conversion process are at small-to-moderate scale agricultural and/or waste treatment facilities, which can find operation of complex equipment to be burdensome or unmanageable. A fourth problem is that the efficiency of these processes has so far been very far from theoretical; as a result energy inputs are often so high as to approximate or even exceed the value of the obtained products.

US 2012-0110896 describes a process in which biomass is fed into a reactor that is previously heated and pressurized to reaction conditions. The subsequent reaction is then performed in less than five minutes. This process is said to improve process economics and to produce a somewhat more uniform conversion product than previous hydrothermal conversion processes. However, the process is limited to producing solid products; at the low reaction times, the conversion is quite incomplete (as evidenced by the presence of sugars in the product); and the process is essentially a batch operation.

Ocfemia et al., in Transactions of the American Society of Agricultural and Biological Engineers Vol. 49(2):533-541, describe a continuous process for converting swine manure to oily biofuels. The process makes use of a continuous stirred tank reactor operated under a carbon monoxide atmosphere to facilitate conversion to products with high carbon and hydrogen contents. The authors report problems with pumping and residence times of approximately an hour.

What is desired is a hydrothermal conversion process that is easy to operate, requires a low or at most moderate capital expenditure, achieves high conversions quickly, and produces a less variable hydrothermal conversion product mixture.

In a first aspect, the present invention is a hydrothermal conversion process wherein a particulate solid organic feedstock is reacted with water at a temperature of at least 160° at a superatmospheric pressure sufficient to maintain the water in subcooled liquid state to produce one or more hydrothermal conversion products selected from a) a carbonized solid and b) at least one liquefaction product, wherein 1) an aqueous slurry of particles of the organic feedstock in liquid water having a temperature of up to 100° C. is mixed under elevated pressure with a steam stream, under conditions such that upon mixing all or a portion of the steam condenses and a reaction mixture having a temperature of at least 160° C. is formed at a pressure such that water including the condensed steam remains as a subcooled liquid;
2) the reaction mixture is maintained at a temperature of at least 160° C. and at a temperature sufficient to maintain water including the condensed steam as a subcooled liquid for a period of time sufficient to produce the one or more hydrothermal conversion products; and then
3) recovering the one or more hydrothermal conversion products.

In a second aspect, the invention is a hydrothermal conversion process wherein a particulate solid organic feedstock is reacted with water at a temperature of at least 160° at a superatmospheric pressure sufficient to maintain the water as a subcooled liquid to produce one or more hydrothermal conversion products selected from a) a carbonized solid and b) at least one liquefaction product, including the steps of 1-a) pressurizing an aqueous slurry of the organic feedstock particles in liquid water to a pressure of at least 608 kPa at temperature of up to 100° C.;
1-b) separately forming pressurized steam at a temperature of at least 160° C.;
1-c) mixing the aqueous slurry and pressurized steam under an elevated pressure to form a reaction mixture, whereby upon the mixing all or a portion of the steam condenses and a reaction mixture having a temperature of at least 160° C. forms, wherein the elevated pressure is sufficient to maintain water including the condensed steam as a subcooled liquid;
2) maintaining the reaction mixture at a temperature of at least 160° C. and at a temperature sufficient to maintain water including the condensed steam as a subcooled liquid for a period of time sufficient to produce the one or more hydrothermal conversion products; and then 3) depressurizing the reaction mixture such that at least portion of the liquid water is converted to a gas, and recovering the one or more hydrothermal conversion products.

In another aspect, the invention is a process for treating municipal or agricultural sewage, comprising the steps of A. treating the sewage in a microbial digester to produce a microbial digestion product that includes biogas and a sludge, where the sludge contains solid organic matter dispersed in an aqueous phase, B. separating biogas from the sludge; and C. converting all or a portion of the sludge to a hydrothermal conversion product according to the process of the first or second aspect of the invention, in which the sludge forms all or a part of the particulate solid organic feedstock.

In still another aspect, the invention is a hydrothermal conversion process wherein a particulate solid organic feedstock is reacted with water at a temperature of at least 160° at a superatmospheric pressure sufficient to maintain the water as a subcooled liquid to produce one or more hydrothermal conversion products selected from a) a carbonized solid and b) at least one liquefaction product, wherein 1) an aqueous slurry of particles of the organic feedstock in liquid water is preheated in a heat exchanger to a temperature of up to 140° C. under sufficient pressure to keep the water in the liquid aggregate state;
2) the preheated aqueous slurry is introduced into a reactor in which the slurry is heated to a temperature of at least 160° C. under sufficient pressure to keep the water as a subcooled liquid and then maintained under such conditions of temperature and pressure for a period of time sufficient to produce a reaction product mixture containing water and the one or more hydrothermal conversion products;
3) withdrawing the reaction product mixture from the reactor;
4) passing at least a portion of the reaction product mixture through the heat exchanger to provide energy for heating the aqueous slurry in step 1), whereby such portion of the reaction product mixture is cooled;
5) prior to or after step 4), depressurizing the reaction product mixture such that at least a portion of the liquid water is converted to a gas and the reaction mixture separates into a gas phase and a liquid phase that may include at least one dispersed solid hydrothermal conversion product;
6) recovering one or more hydrothermal conversion products from the liquid phase.

The invention offers many advantages. The process requires only short reaction times. Simple and relatively inexpensive equipment can be used to operate the process. The process is easily scalable. Process conditions can be selected to produce a solid carbonized product or liquefaction products. Living biological materials are killed and other biologically active materials are deactivated in the process. The exothermic heat of reaction often is nearly equal to if not more than the energy input into the process; by capture and re-use of this energy, the process can operate with little or no net energy input (and even net energy production); when the fuel value of the hydrothermal conversion product is taken into account, this process is especially energy-efficient. When coupled to an upstream microbial digestion process, biogas produced in such upstream digestion process can be used as an energy source for the process, which further improves the energy balance and can lead to an overall process that produces as much or more energy as it requires to operate.

The organic feedstock used in this invention includes a particulate that is a solid at the temperature of the process. At least some of the particles of the organic feedstock preferably are not soluble in water at the process temperature. The organic feedstock may contain, in addition to the particulate solid, one or more organic materials that have melting temperatures below the process temperature and/or which are soluble in water at the process temperature.

The organic feedstock includes one or more solid organic materials. The organic materials include compounds having at least one C—H bond, and more typically also include at least one carbon-oxygen bond and/or at least one carbon-nitrogen bond. The organic compounds may contain other types of bonds, such as (without limitation) one or more carbon-halogen bonds, one or more carbon-phosphorus bonds, one or more carbon-sulfur bonds, one or more oxygen-hydrogen bonds, one or more nitrogen-hydrogen bonds, as well as others. The solid organic feedstock may have an oxygen:carbon atomic ratio of at least 0.5 and a hydrogen:carbon atomic ratio of at least 1.5, preferably at least 1.75.

Some or all of the organic compounds may be of biological origin i.e., one or more materials produced by biological processes. Organic materials of biological origin include plant tissues, i.e., whole plants as well as parts of plants such as stems, leaves, seeds, seed pods or other fruit, flowers and roots; and cellulosic or lignocellulosic plant products such as cellulose, cotton, linen, other plant fibers, wood, and the like. Such plant tissues may include, for example, various stover products (where "stover" refers to plant residue of annual plants that remains after harvest or otherwise at the end of the growing season), straw, hay, leaves, branches, trunks and/or roots of trees, and the like. The plant matter may include plant products such as paper, rope and other fibrous products, cardboard, wood, wood particles (including sawdust) and other waste from sawmill operations, waste wood and waste wood products, or other lignocellulosic material of plant origin.

Another type of organic material of biological origin is animal tissue such as animal cadavers and animal parts such as muscles, skin, hair, internal organs, connective tissue and the like. Animal tissues also include animal products such as, for example, leather, hair, wool and the like.

Other types of organic material or biological origin include microbial biomass such as bacteria, yeast, algae and other microbes, which may be living or dead.

Yet other types of organic material of biological origin include animal feces (which may include human feces), which feces may have been previously treated through a pretreatment process such as a digestion, composting, or fermentation process. Feces (whether pretreated or not) typically contains microbial material, which typically includes bacteria or other microbes such as are present in the gut of the animal that produced the feces. The microbial material may include microbes that are added to the fecal matter in a pretreatment step, such as aerobic or anaerobic digestion or fermentation processes. The microbial material may include live cells, dead cells or both. Feces also typically includes undigested plant or animal tissue (such as fiber), fat, and/or protein in addition to the microbial material.

In an embodiment of particular importance to this invention, the organic feedstock includes a sludge produced in the microbial digestion of fecal matter (optionally together with other organic feedstocks such as garbage and/or plant or animal tissues) by microbial action. The organic matter may be a blend of this sludge and one or more other types organic matter.

The organic matter of biological origin can take the form of wastes from various processing operations, such as wastes from agricultural harvesting and processing, slaughterhouse, butchery or other meat-processing wastes; household and other garbage and/or rubbish; wastes from food-processing operations (for human and/or animal consumption, or in the production of fertilizers), wastes from restaurants, groceries or entertainment facilities, and the like.

In addition to the foregoing feedstock materials, industrial wastes and by-products and recovered materials including various types of polymeric materials are useful. For example, polymeric scrap or trim from various types of thermoplastic and/or thermosetting polymer processing operations can be used, as well as recycled thermoplastic and/or thermoset polymers.

The solid feedstock preferably is in the form of particles having a surface area of 40 $cm^2$ or less. 40 $cm^2$ corresponds approximately to cubic particles 2.54 cm (1 inch) on a side or spherical particles 3.5 cm in diameter. The particles preferably have surface areas of 3.2 $cm^2$ or less (which corresponds to spherical particles approximately 1 cm in diameter), and more preferably have surface areas of 0.03 $cm^2$ or less (which corresponds to spherical particles approximately 1 mm in diameter). The surface area of the particles may be significantly smaller than that, down to and including the surface area of individual microbes. The surface area may be, for example, 0.01 $cm^2$ or less, 0.001 $cm^2$ or less, 0.0001 $cm^2$ or less, and as small as, for example, 0.00000001 $cm^2$. The surface area of the particles in some cases may be more convenient to express in terms of surface area per unit weight. The surface area of the particles per unit weight may be, for example, at least 0.0001 $m^2/g$, at least 0.0006 $m^2/g$, at least 0.001 $m^2/g$, at least 0.01 $m^2/g$, at least 0.1 $m^2/g$, at least 1 $m^2/g$, up to 50 $m^2/g$ or more.

The particles of organic feedstock are provided to the process in the form of an aqueous slurry in liquid water. The solids content (including the organic feedstock and other undissolved materials) of the slurry can be any amount provided that the slurry is pumpable. However, dilute slurries are preferred from the standpoint of easy handling, rapid mixing and control of the exotherm. Therefore, the slurry may have a solids content as low as 0.1% by weight, preferably at least 0.5% by weight and more preferably at least 1% by weight, up to, for example, 30% by weight, preferably up to 20% by weight, more preferably up to 15% by weight and even more preferably up to 10% by weight. In some embodiments, the solids content of the slurry is 1 to 10%, 1 to 8% or 1 to 5% by weight. Preferably, undissolved material other than the organic feedstock constitutes no more than 5%, more preferably no more than 1% of the weight of the slurry.

The aqueous phase of the slurry includes water, which may have various materials dissolved therein. The dissolved materials may include, for example, inorganic salts, water-soluble organic materials including water-soluble biological materials such as proteins, sugars, saccharide oligomers, and the like; surfactants and/or flocculants; and the like.

The temperature of the slurry immediately prior to contacting it with the steam stream is up to 100° C. It may be any lower temperature provided the aqueous phase is liquid. The slurry temperature may be at least 25° C., at least 30° C. or at least 35° C., and in some embodiments is up to 90° C., up to 80° C., up to 70° C. or up to 50° C.

The slurry is contacted with a steam stream. The steam stream may consist essentially of steam. It is also within the invention to use a mixture that includes both steam and liquid water. An advantage of this latter approach is that it becomes unnecessary to convert all of a water source to gas. Because most water sources include dissolved minerals and other dissolved impurities, there is an advantage in converting only part of the water to steam, leaving enough water in the liquid state to prevent or reduce the precipitation of the dissolved minerals. This can reduce or eliminate scaling. When the steam stream is a mixture of liquid water and steam, the proportion of the water present as steam may be, for example, as least 5 weight-%, at least 10 weight-%, at least 25 weight-%, at least 40 weight-%, at least 50 weight-%, up to 99.9 weight-%, up to 95 weight-%, up to 90 weight-%, or up to 75 weight-%, with the remainder as liquid water. The steam stream is at an elevated (superatmospheric) pressure at the time of mixing with the organic feedstock slurry.

The feedstock slurry and the steam stream are mixed. The conditions of mixing are such that (1) all or a portion of the steam condenses upon mixing; (2) the resulting reaction mixture has a temperature of at least 160° C. and (3) the pressure is such that liquid water in the resulting reaction mixture, including the condensed steam, remains as a subcooled liquid.

For purposes of this invention, water is considered to exist as a subcooled liquid when it is at a temperature above 100° but under a pressure sufficient to force it to be a liquid.

The attainment of the necessary temperature and pressure conditions upon performing the mixing step is achieved through the simultaneous selection of various operating parameters including (1) the temperature of the feedstock slurry, (2) the heat capacity of the feedstock slurry (which depends in part upon its solids content); (3) the temperature of the steam stream, (4) the proportions of steam and liquid water (and other components, if any) of the steam stream, (5) the relative proportions of the feedstock slurry and the steam stream, and (6) the applied pressure.

The temperature which the mixture will attain upon mixing (without further heating during the mixing step) is readily estimated from thermodynamic considerations, such as the heat capacities of the feedstock stream and steam stream, the enthalpies of the streams, their respective temperatures, their respective volumes, the proportions of steam and liquid water in the steam stream, and applied pressure.

The temperature of the steam stream when it is brought into contact with the feedstock slurry may be, for example, from 140° C. to as much as 1000° C. A preferred temperature is at least 160° C. to 500° C. and a more preferred temperature is 200 to 350° C.

The pressure during the mixing step may be, for example, from 0.5 to 50 MPa, preferably 1 to 30 MPa. It is preferred to separately pressurize the feedstock slurry and the steam stream to a pressure approximately (such as 0.1 to 10 times, preferably 0.5 to 2 times, more preferably 0.75 to 1.25 times, even more preferably 0.9 to 1.1 times) that of the mixing step pressure before combining them together in the mixing step.

The reaction mixture formed by mixing the feedstock slurry and the second aqueous stream has a temperature at least 160° C. A temperature may be at least 180° C., at least 200° C. or at least 220° C. The temperature may be up to 1000° C., up to 500° C., up to 400° C., up to 350° C. or up to 300° C. This temperature preferably is achieved without application of heat during the mixing step (i.e., adiabatically), although it is within the scope of the invention to apply heat during the mixing step. Some mixing energy may be converted to heat energy and contribute to the attainment of the reaction temperature, but this contribution is believed to be small.

The temperature and pressure of the reaction mixture formed by mixing the feedstock slurry and steam stream may be selected to produce specific types of hydrothermal conversion products. Hydrothermal conversion conditions in general preferably include an operating temperature of at least 160° C. and a pressure sufficient to maintain water as a subcooled liquid at the operating temperature. The formation of carbonized solids tends to be favored at milder temperature and pressure conditions, such as a temperature of 160 to 300° C. and a pressure of 1.5 to 8 MPa, especially 2 to 6 MPa. Production of liquefaction products tends to be favored at temperatures of 160 to 400° C., especially 250 to 380° C. and pressures of 8 to 30, especially 10 to 22 MPa.

The condensation of at least part of the steam during the mixing step releases the heat of vaporization of the condensed steam. This heat increases the temperature of the reaction mixture, and as a result the temperature of the reaction mixture, and the rate of heating the feedstock slurry from its initial temperature of 100° C. or less to the reaction temperature, typically are considerably higher than would be predicted from simple mixing of the feedstock slurry and steam stream. This is an important advantage of this invention, as heating to the reaction temperature can occur in very short time frames in part due to the heat released from the condensation of steam. With good mixing, the temperature of the reaction mixture can reach 160° C. in 10 seconds or less from the time the starting materials are contacted, even without applied heat during the mixing step. This reduces or even eliminates any requirement for preheating the feedstock slurry before the mixing step, which can greatly reduce energy requirements. In addition, only a portion of the water in the reaction mixture needs to have been converted to steam before the mixing step, and to the extent the steam condenses, energy used to vaporize water to make steam is recovered in the mixing step. The captured heat of vaporization also permits the steam to be heated to a lower temperature than would otherwise be needed to produce a given reaction temperature. In some cases, the temperature of the steam stream can be equal to or even less than the temperature produced in the reaction mixture upon mixing the steam stream and feedstock slurry.

The condensation of steam during the mixing step will result in a certain loss of volume as gaseous water is converted to a liquid, and for that reason it is generally necessary to apply pressure in the mixing apparatus to maintain the necessary pressure. This can be done, for example, by pressurizing either or both of the feedstreams, by introducing a pressurizing gas, and by various other mechanical means.

The feedstock slurry and steam stream can be mixed using any liquid-gas mixing apparatus. The feedstock slurry and steam stream may be introduced simultaneously into the mixing apparatus, although it is possible to introduce them sequentially in either order. The steam stream preferably is introduced into the mixing zone through a nozzle, a bubbler or other device that distributes the steam in the form of bubbles. The feedstock slurry also can be fed through a nozzle or similar device to atomize the slurry, such that the steam stream contacts droplets of the feedstock slurry. Examples of suitable mixing devices include, for example, opposing flow T-mixers; normal flow T-mixers; opposing flow T-mixers with a nozzle at either or both of the incoming streams; normal flow bend mixers; normal flow bend mixers equipped with a steam nozzle; parallel flow mixers, especially equipped with a nozzle; normal multi-hole injection mixers, especially equipped with a steam nozzle, and parallel multi-hole injection nozzles. Turbulent flow in the mixing zone facilitates rapid mixing and heating to the reaction temperature. In each of the foregoing cases, the mixer may be incorporated within a plug flow reactor (such as a pipe reactor) as described below.

Cavitation caused by the condensation of steam is believed to contribute to the turbulence and rapid mixing. This turbulence can lead to erosion and degradation of the mixing and/or reaction vessel. To reduce this, one may heat the mixer walls to a temperature higher than the saturation temperature at the operating pressure in order to reduce cavitation proximate to the mixer walls. This will reduce erosion and degradation of the mixer material. The mixing and/or reaction vessel may be constructed from an erosion resistant material having low brittleness and high hardness, such as stainless steel having primarily martensitic morphology. Such a stainless steel may contain approximately 6% Ni and 12% Cr.

Although the process can be operated more slowly, it is highly preferred to perform the process under conditions that steam condensation occurs and the reaction mixture attains a temperature of 160° C. within 10 seconds of mixing, with or preferably without added heat. In some embodiments, steam condensation occurs and reaction mixture attains a temperature of 160° C. within 5 seconds of mixing. In other embodiments, steam condensation occurs and the reaction mixture attains a temperature of 200° C. within 10 seconds, preferably with 5 seconds, of mixing. In other embodiments, steam condensation occurs and the reaction mixture attains a temperature of 220° C. within 10 seconds, preferably with 5 seconds, of mixing. In yet other embodiments, steam condensation occurs and the reaction mixture attains a temperature of 250° C. within 10 seconds, preferably with 5 seconds, of mixing. In still other embodiments, steam condensation may occur and the reaction mixture attains the reaction temperature within 10 seconds, preferably with 5 seconds, of mixing. In all the foregoing cases, the attainment of the indicated temperature may be done with applied heat (apart from any energy of mixing), but preferably is achieved without adding heat, i.e., adiabatically. It is noted that the heat of vaporization released upon the condensation of steam is believed to contribute greatly to the rapid attainment of the reaction temperature.

After the reaction mixture is formed as described above, it is maintained at a temperature of at least 160° C. and sufficient pressure to maintain water including condensed steam as a subcooled liquid for a period of time sufficient to produce one or more hydrothermal conversion products. The time required depends in part upon reaction conditions (primarily temperature and pressure) and the particular hydrothermal conversion products to be produced (with liquefaction products generally requiring a longer reaction time than carbonized solids). The reaction is typically exothermic; therefore, it is in most cases not necessary to apply additional heat to maintain the reaction temperature and to the contrary may be necessary to apply cooling to remove exothermic heat from the reaction mixture. Therefore, in preferred embodiments, no heat is applied during the reaction step. Waste heat can be captured and used to facilitate steam formation, preheat the feedstock slurry or in some other useful way.

The reaction step is conveniently performed in a plug-flow type reactor, in which there is little if any mixing in the main direction of movement through the reactor. Other types of reaction vessels also are useful. A useful type of plug-flow reactor is a pipe reactor. An advantage of a plug-flow reactor is the ability of a plug-flow reactor to handle large pressures at low capital expense. Plug-flow reactors also lend themselves easily to continuous or semi-continuous processes, which can offer significant operational and cost advantages. Still another advantage of plug-flow reactors is that due to the relatively small cross-sectional area of the reaction zone, it is easy to maintain constant or nearly constant reaction conditions throughout the reaction mixture as it reacts. This makes the process more predictable and reduces variation in the product (at given reaction conditions). The high external surface area (per unit volume) of plug-flow reactors allows heat to be withdrawn (or applied) efficiently, as may be needed to maintain needed temperatures.

A plug-flow reactor in some embodiments is a pipe reactor (which may incorporate a mixing device as described above), which can have an internal diameter of, for example, 1 to 110 mm, preferably 6 to 55 mm, more preferably 6 to 30 mm.

In some embodiments, the mixing and reaction steps are performed in a single vessel, such as a single plug-flow reactor (which may be a single pipe reactor). In such an embodiment, the reaction vessel may include separate mixing and reaction zones. If separate mixing and reaction zones are used, various types of valving can be interposed between the mixing and reaction zones to control flow between the zones and to regulate pressure in the respective zones.

In other embodiments, the mixing step is performed in one apparatus (such as a first plug-flow reactor) and then transferred to a second apparatus (such as one or more additional plug-flow reactors) where the reaction step takes place. It is noted that because of the rapid rate of reaction achieved with this process, some reaction will take place even in a separate mixing zone, and it is difficult or impossible to achieve a clean separation of mixing and reaction.

A plug-flow or pipe reactor is well-adapted for continuous or intermittent operation. In continuous operation, the starting materials are introduced continuously into the mixing zone and the resulting reaction mixture flows continuously from there into the reaction zone (which as before may be the same or a different vessel) and continuously out of the reaction zone. Residence times are controlled (via flowrates and equipment sizing) such that enough reaction time is provided to produce the desired hydrothermal conversion product(s) before the product(s) are discharged from the reaction zone. Semi-continuous or intermittent operation can by achieved by intermittently introducing the reaction mixture into the mixing zone and holding the mixture in the reaction zone for a period of time to allow the reaction to take place. This is followed by intermittent withdrawal of the reaction product mixture. If the mixing zone feeds multiple reaction zones (for example, as described below with respect to FIG. 2), it is possible to operate the mixing step continuously and the reaction step semi-continuously.

Once the reaction has proceeded to the desired state of conversion, one or more hydrothermal conversion products are recovered. This can be done mechanically, by for example, filtering, decanting, centrifuging, and the like. In a preferred method, the recovery is performed at least in party by depressurizing the reaction mixture such that at least a portion of the subcooled liquid water becomes converted to gas. The depressurization can be performed by discharging the slurry to a region of lower pressure. The release of pressure itself cools the hydrothermal conversion product due to the expansion (i.e., flash evaporation of gaseous components of the reaction mixture and the volatilization of volatile components (such as water). If more cooling is needed to recover the hydrothermal conversion product(s), this can be performed using cooling methods well known in the art.

The reaction vessel therefore will include one or more outlets from which the reaction mixture (including the hydrothermal conversion product(s)) is discharged from the vessel upon completion of the reaction. The outlet may include valving and/or other pressure regulation means, such as an orifice, nozzle, or pressure regulator, that helps to maintain (together with upstream pressurization means) the necessary pressure in the reaction vessel.

In preferred embodiments, the reaction mixture containing hydrothermal conversion products is spray-dried to at least partially separate one or more hydrothermal conversion products from water. Spray-drying involves discharging the hot reaction mixture to a zone of atmospheric or subatmospheric pressure, whereby the release of pressure causes some or all of the water to flash, leaving behind solid or liquid hydrothermal conversion products. The hot reaction mixture may be discharged through a spray-head or other device that forms it into droplets or a mixture of droplets and solid particles. The release of pressure and volatilization of water (and in some cases low-boiling point organic materials) results in a temperature drop which at least partially cools the remaining hydrothermal conversion products.

The hydrothermal conversion product of the invention includes at least one material that is liquid or solid at room temperature and one atmosphere pressure. Solid hydrothermal conversion products are sometimes known as "char", "synthetic coal" or similar names, and may be characterized by having an oxygen:carbon atomic ratio of <0.4, <0.3, <0.2, <0.1 or <0.05, a nitrogen:carbon atomic ratio of <0.2, <0.1, <0.05 or <0.025, and/or a hydrogen:carbon atomic ratio of <1.5, <1.2, <1.0 or <0.8. Solid hydrothermal conversion products typically are obtained in the form of small particles, which can be aggregated into larger particles via methods such as flocculation, compression, aggregation, agglomeration and the like if desired.

Solid hydrothermal conversion products are useful as fuels and fertilizers. They may instead be returned to the environment such as by landfilling or burial. An advantage of this invention is that the hydrothermal conversion kills living cells that may be present in the feedstock and therefore produces a sterile product, which reduces risks in cases in which the solid hydrothermal conversion product is returned to the environment (such as through use as fertilizer or disposal by means such as landfilling or burial). Biologically active materials other than living cells, generally being organic materials, are also usually inactivated during the hydrothermal conversion process.

Liquefaction products are carbon-containing compounds that are liquid at room temperature and one atmosphere pressure. These include various oily compounds that may have molecular weights, for example, from 350 to 3000, especially 500 to 1500, as well as various liquid organic compounds having molecular weights of about 60 to about 350, including, for example, hydrocarbons, liquid phenolic compounds, phenolic ethers, benzoic acid and derivatives, liquid furanes, liquid furfurals, and polyfuranes, liquid aldehydes, liquid amine compounds, liquid pyroles, liquid pyridines, and the like. Some liquefaction products may be characterized by having an oxygen:carbon atomic ratio of <0.8, <0.6, <0.4, <0.2 or <0.1, a nitrogen:carbon atomic ratio of <0.5, <0.25 or <0.1, and/or a hydrogen:carbon atomic ratio of <1.5, <1.0 or <0.8. Liquefaction products can be used as fuels (such as biodiesel), as renewable solvents or (entirely or partially) as raw materials for manufacturing various chemical compounds.

The reaction typically also produces one or more gaseous (at room temperature and one atmospheric pressure) reaction products such as carbon dioxide, nitrogen, NOx compounds, carbon monoxide, methane and water.

Figure 1:
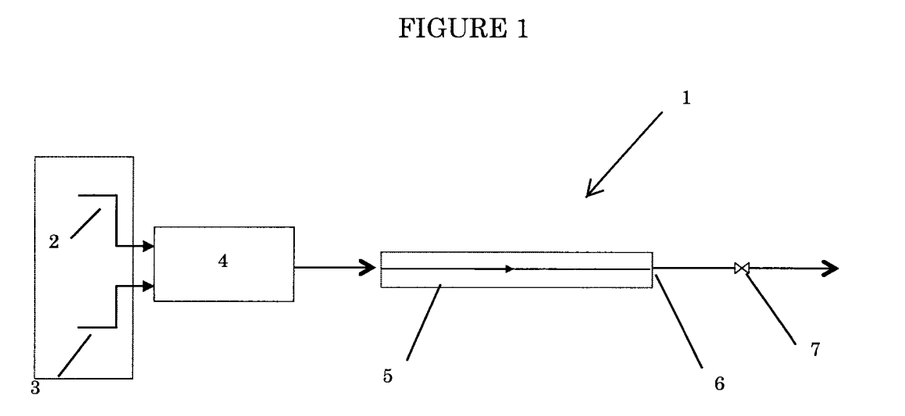
FIG. 1 is a schematic drawing of a first embodiment of the invention.

The process of the first aspect of the invention is illustrated schematically in FIG. 1. In FIG. 1, reaction system 1 includes supply lines 2 and 3, through which the feedstock slurry and the steam stream are respectively supplied to mixer 4 where at least some of the steam condenses and the starting materials are brought (optionally with addition of applied heat) to the reaction temperature as described before. The resulting reaction mixture is then transferred to reactor 5 where the hydrothermal conversion takes place. The extent of reaction will of course depend on conditions and residence time. A valve or other pressure regulator 7 is positioned at or near outlet end 6 of reactor 5. Reaction products are discharged from outlet end 6 of reactor 5 to a region of lower pressure, where some or all of the water is converted to a gas and recovery of a carbonized solid or one or more liquefaction products takes place. As shown, mixer 4 and reactor 5 are different pieces of equipment but, as explained above, can be combined into a single apparatus such as a plug flow reactor equipment with mixing means for mixing the steam stream with the feedstock slurry.

Figure 2:
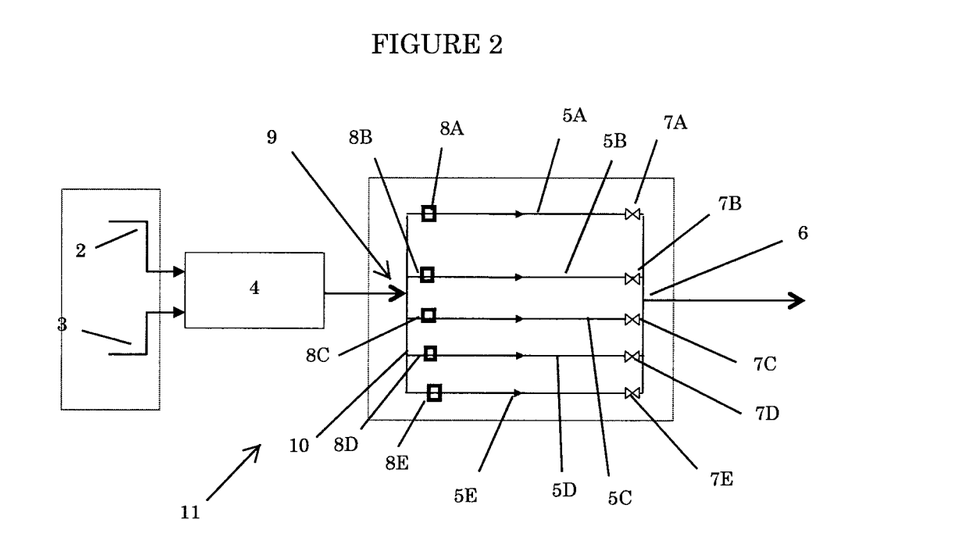
FIG. 2 is a schematic drawing of a second embodiment of the invention.

An advantage of this invention is that it is readily scalable. FIG. 2 schematically illustrates an exemplary approach to scaling. In FIG. 2, reaction system 11 includes supply lines 2 and 3, through which feedstock slurry and the steam stream are respectively supplied to mixing zone 4 as described with respect to FIG. 1. Multiple reaction zones 5A, 5B, 5C, 5D and 5E (arbitrarily shown as five such zones for purposes of illustration, although any number of reaction zones may be present) each are in fluid communication with mixing zone 4. In this embodiment, distribution means (shown generally at 9) includes piping 10 and on/off or flow diversion valves 8A, 8B, 8C, 8D and 8E, through which mixing zone 4 is connected to reaction zones 5A, 5B, 5C, 5D and 5E, respectively. Distribution means 9 typically will further include control means (such as computerized control means) for actuating valves 8A, 8B, 8C, 8D and 8E to distribute the reaction mixture produced in mixing zone 4 among the multiple reaction zones 5A, 5B, 5C, 5D and 5E. The mode of distribution among the reaction zones can vary. In some distribution modes, the reaction mixture is introduced sequentially into each of the reaction zones. This allows for continuous flow through mixing zone 4 and either continuous or intermittent flow through each of the reaction zones. In other embodiments, the reaction mixture is introduced into each of the reaction zones simultaneously. This allows for either continuous or intermittent flow through mixing zone 4 and each of reaction zones 5A, 5B, 5C, 5D and 5E. In other modes of operation, reaction mixture from mixing zone 4 is introduced simultaneously into subsets of two or more of the reaction zones, and then simultaneously into other subsets of two or more of the reaction zones. It is also possible to leave one or more of the reaction zones inactive by bypassing that reaction zone or zones. In this way, overall processing rates can be adjusted as needed.

As in the embodiment shown in FIG. 2, pressure control means 7A, 7B, 7C, 7D and 7E (such as an orifice, an expansion valve, a throttle valve or other pressure regulator valve or a flow restrictor) are positioned at outlet end 6 of each of reaction zones 5A, 5B, 5C, 5D and 5E, respectively. Reaction products are discharged from outlet end 6 to a region of lower pressure, where at least some of the water evaporates and recovery of a carbonized solid or liquefaction products takes place. In the embodiment shown, reaction products from the various reaction zones are combined for discharge, but this is not necessary and reaction products can alternatively be discharged separately from each of the reaction zones.

In an alternative approach to scaling, multiple mixing zones are provided, each in fluid communication to one or more reaction zones. A distribution means such as a header or baffle is provided upstream of the mixing zones, distributing the feedstock slurry and steam stream from a common source of each among the multiple mixing zones and then into the respective reaction zones.

In the embodiments shown in FIGS. 1 and 2, the reaction taking place in the reaction zones is usually exothermic. Reaction zones 5 (in FIGS. 1) and 5A, 5B, 5C, 5D, 5E (in FIG. 2) in some embodiments may be contained within a heat exchanger, in which exothermic heat of reaction is transferred to a thermal fluid (by heating the thermal fluid). Energy captured by the heated thermal fluid can be recovered in various ways, such as by using the heated thermal fluid to preheat the feedstock slurry and/or at least partially heat water to produce steam, in each case, for example, by passing the heated thermal fluid through a heat exchanger to transfer heat to the slurry or water, as the case may be.

It is further within the scope of the invention to otherwise provide heating and/or cooling as necessary to the reaction zones to maintain a suitable temperature.

In some embodiments, the hydrothermal conversion process is part of a larger process for treating municipal or agricultural sewage. The sewage is treated in a microbial digester to produce a microbial digestion product that includes biogas and a sludge. The microbial digester may be an aerobic or anaerobic digester. The sludge contains solid organic matter dispersed in an aqueous phase. The sludge is separated from the biogas. The sludge is fed into and forms at least part of the organic feedstock in a hydrothermal conversion process of the other aspects of the invention. A schematic of an embodiment of such a process is shown in FIG. 3.

If necessary, the solids content of the sludge is adjusted by adding or removing water to form a slurry having a solids content of, for example, about 1 to 10% by weight.

Figure 3:
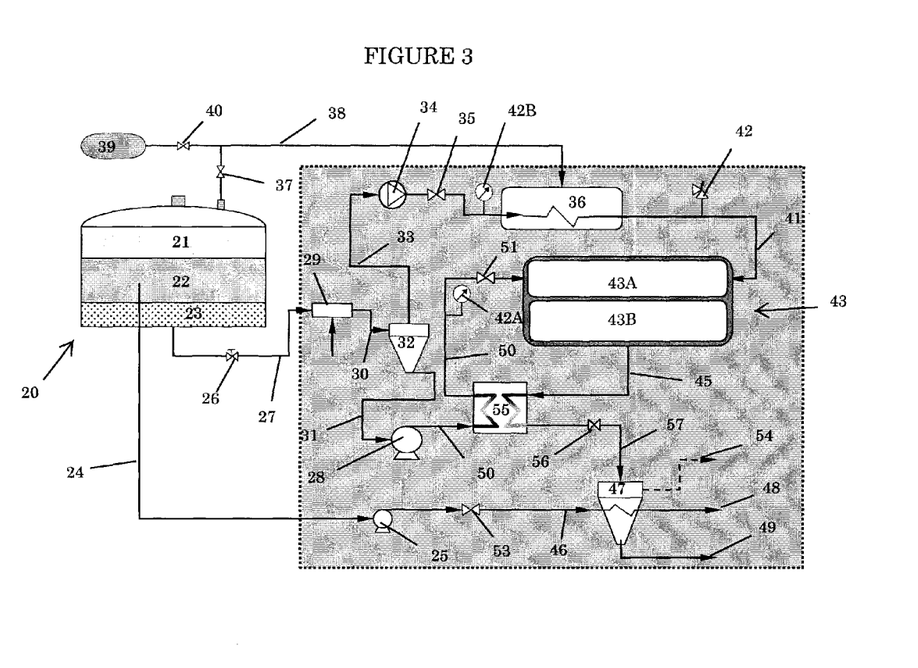
FIG. 3 is a schematic drawing of a third embodiment of the invention.

In FIG. 3, sewage is microbially digested in a microbial digester system shown generally at 20, to form a mixture of biogas 21 and sludge 23. Typically, the digestion process also forms a supernatant liquid 22. Sludge 23 is withdrawn through line 27 (controlled via valve means 26) and transferred to hydrothermal conversion unit 43 (as shown, via lines 30, 31 and 50 by means of pump 28). In the embodiment shown, optional auxiliary equipment includes, additive mixing station 29, centrifuge 32, valve means 51 and heat exchanger 55, which are interposed between anaerobic digestion system 20 and hydrothermal conversion unit 43, to facilitate movement of the sludge through the various lines, to add optional additives such as thickeners or flocculants to the sludge to precondition it or to facilitate the formation of desired hydrothermal conversion products, to adjust the solids level, to otherwise control flow and the preheat the slurry.

In the embodiment shown in FIG. 3, sludge 23 is concentrated in centrifuge 32 to remove a portion of the supernatant water, producing a water stream that is fed via line 33 (which includes pump 34 and valve 35) to boiler 36 for conversion to steam. Alternatively or in addition, some or all of supernatant liquid 22 can be fed to boiler 36 as the source of water for conversion to steam. In the embodiment shown, pressures are monitored through the use of optional pressure gauges 42A and 42B. The pressure in the system may be limited to a predesigned maximum pressure using a safety valve/pressure relief valve or equivalent apparatus.

Hydrothermal conversion unit 43 includes mixing zone 43A, in which a steam stream (introduced through line 41 from boiler 36) and the feedstock slurry (introduced through line 50) are mixed as described before, and a reaction zone 43B, where the reaction mixture reacts to form hydrothermal conversion products as described before. As discussed before, mixing zone 43A and reaction zone 43B may include separate pieces of equipment, or may be consolidated into a single apparatus. In some embodiments, no separate mixing and reaction zones are provided.

Reaction products are withdrawn from hydrothermal conversion unit 43 via line 45. Withdrawal is controlled via valve means 56. An optional heat exchanger 55 is used to recover a portion of the thermal energy of the reaction products for preheating the feedstock slurry. In the embodiment shown, cooling and product recovery is performed in separator 47. Cooling fluid is introduced into separator 47 through line 46. As shown, the cooling fluid can be or include supernatant liquid 22 from microbial digestion system 20, which in the specific embodiment shown is supplied through line 24 and 46, with flow managed by means of pump 25 and valve means 53. Other sources of cooling fluid can be used in place of or in addition to the supernatant liquid 22 from microbial digestion system 20. Spent cooling fluid is withdrawn from separator 47 via line 48. This cooling fluid can be recycled through the process, and in some embodiments can be recycled to microbial (e.g., anaerobic or aerobic) digestion system 20. Product is recovered from separator 47 through line 49. Gases such as steam, water vapor, and other gases are removed from separator 47 through line 54. Separator 47 is only illustrative of various types of useful cooling and recovery equipment. For example, separator 47 may be replaced with a spray drying step as described before.

FIG. 3 also includes the additional optional feature of using biogas 21 produced in microbial digestion system 20 as a fuel source for producing steam in boiler 36. As shown, biogas 21 is transferred to boiler 36 via line 38. Line 38 may include various means for controlling and/or metering flow of biogas 21, such as valve 37. A supplemental fuel source may complement the biogas; in FIG. 3, auxiliary fuel 39 is supplied to line 38 via valve means 40. Biogas 21 and any auxiliary fuel 39 delivered to boiler 36 are combusted to produce heat to boil water to produce steam.

In another aspect of the invention, heat is captured from the reaction product mixture by passing at least a portion of the reaction product mixture through a heat exchanger to provide energy for heating the feedstock slurry in step 1), simultaneously cooling that portion of the reaction product mixture. An embodiment of that aspect of the invention is shown in FIG. 4.

Figure 4:
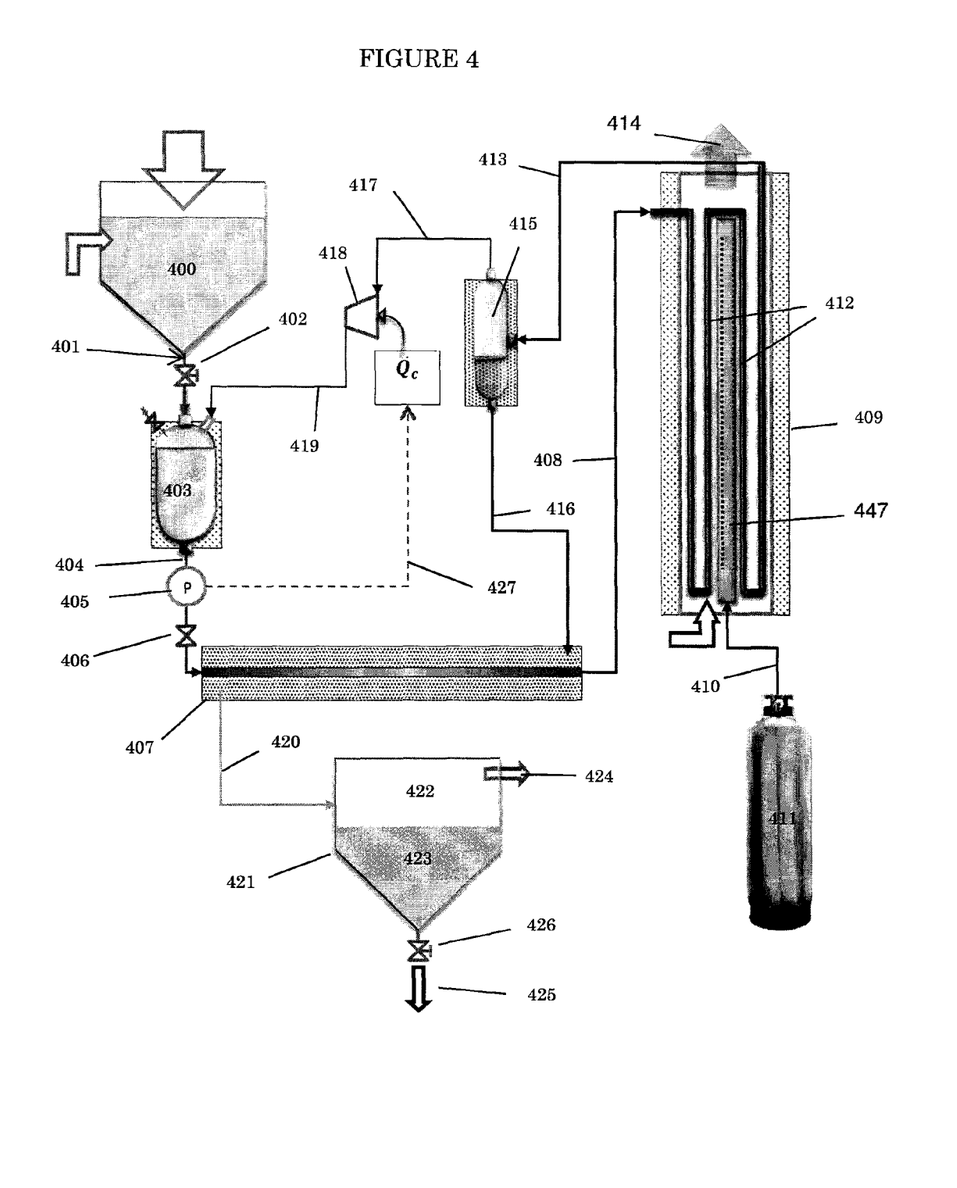
FIG. 4 is a schematic drawing of a fourth embodiment of the invention.

In FIG. 4, feedstock slurry is provided from holding vessel 400 via line 401, which is controlled by valve means 402, into feed tank 403. Feedstock slurry is transferred to heat exchanger 407 via line 404, which in the embodiment shown is equipped with pressure regulator 405 and valve means 406. The feedstock slurry is preheated in heat exchanger 407 to a temperature of up to 100° C. and from there flows through line 408 into reactor 409. The starting feedstock slurry is subjected to hydrothermal conversion in pipe reactors 412 of reactor 409 to produce a reaction product mixture that is withdrawn from reactor 409 through line 413. The reaction product mixture is separated in separator 415 into a gas phase and a liquid phase. In the specific embodiment shown, the liquid phase contains entrained solid reaction products, although in other embodiments such solid material can be separated from the liquid phase in separator 415 or other suitable apparatus.

The liquid phase (which may contain the entrained solids) is transferred via line 416 to heat exchanger 407, where it serves as a heat transfer fluid, transferring a portion of its heat to the feedstock slurry supplied to heat exchanger 407 via line 406. The cooled liquid phase is then transferred from heat exchanger 407 to separation tank 421 via line 420, where the solid components (if any) are separated from the liquids to from liquid phase 422 and concentrated solid phase 423. The liquid phase, which may contain water or a mixture of water and organic liquefaction products, is transferred from separator 421 via line 424 for additional recovery of organic liquefaction products, if necessary or desirable. Concentrated solid phase 423 is removed from separation tank 421 via line 425 which is controlled by valve means 426.

In the embodiment shown in FIG. 4, the hydrothermal conversion is performed by applying external heat to the feedstock slurry within reactor 409. Thus, fuel source 411 provides fuel via line 410 to burner 447 where it is burned to provide energy. Combustion gases are vented through exhaust outlet 414. Alternatively, the hydrothermal conversion can be performed in accordance with the first and second aspects of this invention, as described before, with the formation of separate streams of feedstock slurry and steam which are mixed and allowed to react as described before.

The embodiment shown in FIG. 4 includes another optional feature, in which gases formed in the hydrothermal conversion step are compressed and used as a source of motive force to move the feedstock slurry and reaction products through the system. Thus, gases separated from the reaction product mixture in separator 415 are removed via conduit 417 and compressed using compressor 418. The compressed gas is then transferred via line 419 to pressurized feed tank 403. Feedstock slurry is supplied to pressurized feed tank 403 via line 401 that is controlled via valve means 402. The pressurization obtained in pressurized feed tank provides the motive force for moving the feedstock slurry through the system. Thus, the pressurized feedstock slurry in pressurized feed tank 403 is forced by means of the pressurization through line 404 through heat exchanger 407, reactor 409, back through heat exchanger 407 and to separation tank 421. In the embodiment shown, control of the movement of materials is controlled via valve means 406. When valve means 406 is opened, materials flow through the system, and flow stops when valve means 406 is closed. It will be appreciated that valve means 406 can alternatively be located further downstream, such as on line 420. The operation of valve means 406 may be controlled using computerized controller such as is shown generally at 427 and via one or more pressure regulators 405.

What is claimed is:

1. A hydrothermal conversion process wherein a particulate solid organic feedstock is reacted with water at a temperature of at least 160° at a superatmospheric pressure sufficient to maintain the water in subcooled liquid state to produce one or more hydrothermal conversion products selected from a) a carbonized solid and b) at least one liquefaction product, wherein
   1) an aqueous slurry of particles of the organic feedstock in liquid water and having a temperature of up to 100° C. is mixed under elevated pressure with a steam stream, under conditions such that upon mixing all or a portion of the steam condenses and a reaction mixture having a temperature of at least 160° C. is formed at a pressure such that water including the condensed steam remains as a subcooled liquid;
   2) the reaction mixture is maintained at a temperature of at least 160° C. and at a temperature sufficient to maintain water including the condensed steam as a subcooled liquid for a period of time sufficient to produce the one or more hydrothermal conversion products; and then
   3) recovering the one or more hydrothermal conversion products, wherein steps 1) and 2) are performed in an apparatus comprising
      a) a mixing zone in which the aqueous slurry of particles is mixed with the steam stream to produce the reaction mixture;
      b) at least two reaction zones each separately in fluid communication with the mixing zone via a flow path and
      c) distribution means for distributing a reaction mixture produced in the mixing zone among the reaction zones;
   wherein the distributor includes valving means for selectively opening and closing the flow path to each of the reaction zones for selectively opening the flow path to one or more of the reaction zones while simultaneously closing the flow path to at least one other reaction zone.

2. The process of claim 1 wherein the reaction performed in step 2) is exothermic, waste heat from the exothermic reaction is captured and the captured waste heat is used to preheat the aqueous slurry prior to introducing the aqueous slurry into step 2).

3. The process of claim 1 wherein heat of vaporization released upon the condensation of steam in step 1) at least partially heats the reaction mixture.

4. The process of claim 3 wherein the temperature of the steam stream is at or below the reaction temperature formed upon mixing the steam stream and the aqueous slurry in step 1).

5. The process of claim 1 wherein the reaction time in step 2) is 10 to 1000 seconds.

6. The process of claim 1 wherein step 3) includes a step of depressurizing the reaction mixture such that at least a portion of the subcooled liquid water becomes converted to gas.

7. The process of claim 1 wherein the organic feedstock includes one or more of municipal sewage, agricultural sewage, plant tissue, animal tissue, microbial biomass and a sludge produced by microbial digestion of an agricultural product, an agricultural waste, or municipal or agricultural sewage.

8. The process of claim 1, wherein the aqueous slurry contains 0.1 to 10% by weight of organic feedstock particles.

9. A hydrothermal conversion process wherein a particulate solid organic feedstock is reacted with water at a temperature of at least 160° at a superatmospheric pressure sufficient to maintain the water in subcooled liquid state to produce one or more hydrothermal conversion products selected from a) a carbonized solid and b) at least one liquefaction product, wherein
   1) an aqueous slurry of particles of the organic feedstock in liquid water and having a temperature of up to 100° C. is mixed under elevated pressure with a steam stream, under conditions such that upon mixing all or a portion of the steam condenses and a reaction mixture having a temperature of at least 160° C. is formed at a pressure such that water including the condensed steam remains as a subcooled liquid;
   2) the reaction mixture is maintained at a temperature of at least 160° C. and at a temperature sufficient to maintain water including the condensed steam as a subcooled liquid for a period of time sufficient to produce the one or more hydrothermal conversion products; and then
   3) recovering the one or more hydrothermal conversion products, wherein the hydrothermal conversion product includes a carbonized solid that has an oxygen:carbon atomic ratio of less than 0.2, a nitrogen:carbon atomic ratio of less than 0.2 and a hydrogen:carbon atomic ratio of <1.2.

10. A hydrothermal conversion process wherein a particulate solid organic feedstock is reacted with water at a temperature of at least 160° at a superatmospheric pressure sufficient to maintain the water in subcooled liquid state to produce one or more hydrothermal conversion products selected from a) a carbonized solid and b) at least one liquefaction product, wherein
   1) an aqueous slurry of particles of the organic feedstock in liquid water and having a temperature of up to 100° C. is mixed under elevated pressure with a steam stream, under conditions such that upon mixing all or a portion of the steam condenses and a reaction mixture having a temperature of at least 160° C. is formed at a pressure such that water including the condensed steam remains as a subcooled liquid;
   2) the reaction mixture is maintained at a temperature of at least 160° C. and at a temperature sufficient to maintain water including the condensed steam as a subcooled liquid for a period of time sufficient to produce the one or more hydrothermal conversion products; and then
   3) recovering the one or more hydrothermal conversion products wherein the hydrothermal conversion product includes a liquefaction product that has an oxygen:carbon atomic ratio of less than 0.6, a nitrogen:carbon atomic ratio of less than 0.5 and a hydrogen:carbon atomic ratio of <1.5.

11. The hydrothermal conversion process of claim 9 wherein step 1 is performed by:
   1-a) pressurizing an aqueous slurry of the organic feedstock particles in liquid water to a pressure of at least 608 kPa at temperature of up to 100° C.;
   1-b) separately forming pressurized steam at a temperature of at least 160° C.; and
   1-c) mixing the aqueous slurry and pressurized steam under elevated pressure to form a reaction mixture, whereby upon the mixing the steam condenses and heats the reaction mixture to a temperature of at least 160° C., wherein the elevated pressure is sufficient to maintain water including the condensed steam as a subcooled liquid.

12. A process for treating municipal or agricultural sewage, comprising the steps of
A. treating the sewage in a microbial digester to produce a microbial digestion product that includes biogas and a sludge, where the sludge contains solid organic matter dispersed in an aqueous phase,
B. separating biogas from the sludge; and
C. converting the sludge to a hydrothermal conversion product according to the process of claim 9, in which the sludge forms all or a part of the particulate solid organic feedstock.

13. The process of claim 9 wherein the reaction performed in step 2) is exothermic, waste heat from the exothermic reaction is captured and the captured waste heat is used to preheat the aqueous slurry prior to introducing the aqueous slurry into step 2).

14. The process of claim 9 wherein heat of vaporization released upon the condensation of steam in step 1) at least partially heats the reaction mixture.

15. The process of claim 14 wherein the temperature of the steam stream is at or below the reaction temperature formed upon mixing the steam stream and the aqueous slurry in step 1).

16. The hydrothermal conversion process of claim 10 wherein step 1 is performed by:
1-a) pressurizing an aqueous slurry of the organic feedstock particles in liquid water to a pressure of at least 608 kPa at temperature of up to 100° C.;
1-b) separately forming pressurized steam at a temperature of at least 160° C.; and
1-c) mixing the aqueous slurry and pressurized steam under elevated pressure to form a reaction mixture, whereby upon the mixing the steam condenses and heats the reaction mixture to a temperature of at least 160° C., wherein the elevated pressure is sufficient to maintain water including the condensed steam as a subcooled liquid.

17. A process for treating municipal or agricultural sewage, comprising the steps of
A. treating the sewage in a microbial digester to produce a microbial digestion product that includes biogas and a sludge, where the sludge contains solid organic matter dispersed in an aqueous phase,
B. separating biogas from the sludge; and
C. converting the sludge to a hydrothermal conversion product according to the process of claim 10, in which the sludge forms all or a part of the particulate solid organic feedstock.

18. The process of claim 10 wherein the reaction performed in step 2) is exothermic, waste heat from the exothermic reaction is captured and the captured waste heat is used to preheat the aqueous slurry prior to introducing the aqueous slurry into step 2).

19. The process of claim 10 wherein heat of vaporization released upon the condensation of steam in step 1) at least partially heats the reaction mixture.

20. The process of claim 19 wherein the temperature of the steam stream is at or below the reaction temperature formed upon mixing the steam stream and the aqueous slurry in step 1).

* * * * *